United States Patent [19]

Michalak et al.

[11] Patent Number: 4,565,679
[45] Date of Patent: Jan. 21, 1986

[54] METHOD OF REGULATING THE AMOUNT OF REDUCING AGENT ADDED DURING CATALYTIC REDUCTION OF $NO_x$ CONTAINED IN FLUE GASES

[75] Inventors: Stanislaw Michalak; Klaus-Dieter Weber, both of Reichshof; Jürgen Meier, Wiehl, all of Fed. Rep. of Germany

[73] Assignee: L. & C. Steinmüller GmbH, Gummersbach, Fed. Rep. of Germany

[21] Appl. No.: 661,892

[22] Filed: Oct. 17, 1984

[30] Foreign Application Priority Data

Oct. 18, 1983 [DE] Fed. Rep. of Germany ....... 3337793

[51] Int. Cl.$^4$ ......................... B01J 8/00; C01B 21/00; C01G 31/00
[52] U.S. Cl. .................................. 423/239; 423/235; 422/62; 422/110
[58] Field of Search .................. 423/235, 235 D, 239, 423/239 A; 422/62, 110

[56] References Cited

U.S. PATENT DOCUMENTS

| | | | |
|---|---|---|---|
| 3,067,014 | 12/1962 | Morgan | 422/110 |
| 4,302,205 | 11/1981 | Muraki et al. | 422/62 |
| 4,473,536 | 9/1984 | Carberg et al. | 423/235 |
| 4,473,537 | 9/1984 | Ford et al. | 423/235 |

FOREIGN PATENT DOCUMENTS 2902706   1/1979   Fed. Rep. of Germany ........ 422/62

*Primary Examiner*—Gregory A. Heller
*Attorney, Agent, or Firm*—Becker & Becker, Inc.

[57] ABSTRACT

A method of regulating the amount of reducing agent added, especially $NH_3$ in the case of the catalytic reduction of $NO_x$ of flue gases which originate from a combustion installation which is fired with fossil fuels. The adjustment value for the quantity to be added is determined in response to a prescribed reducing agent/$NO_x$ stoichiometry factor from the quantity of combustion air supplied to the combustion installation or from the exiting quantity of flue gas, and from the $NO_x$ concentration downstream of the catalyzer. Regulation is effected by influencing the stoichiometry factor. The $NO_x$ concentration downstream after the catalyzer is returned to the regulation process as the primary correction value, and the reducing agent concentration downstream after the catalyzer, and the flue gas temperature ahead of the catalyzer, are returned to the regulation process as the secondary correction values. The set stoichiometry factor is influenced such that while maintaining the emission limit value as the desired value of the primary correction value, and while maintaining a reducing agent concentration downstream after the catalyzer below a prescribed fixed value in a range of from 50 to 3 ppm volume, preferably less than 10 ppm volume, the stoichiometry factor is regulated via the temperature-dependent activity curve of the catalyzer.

4 Claims, 1 Drawing Figure

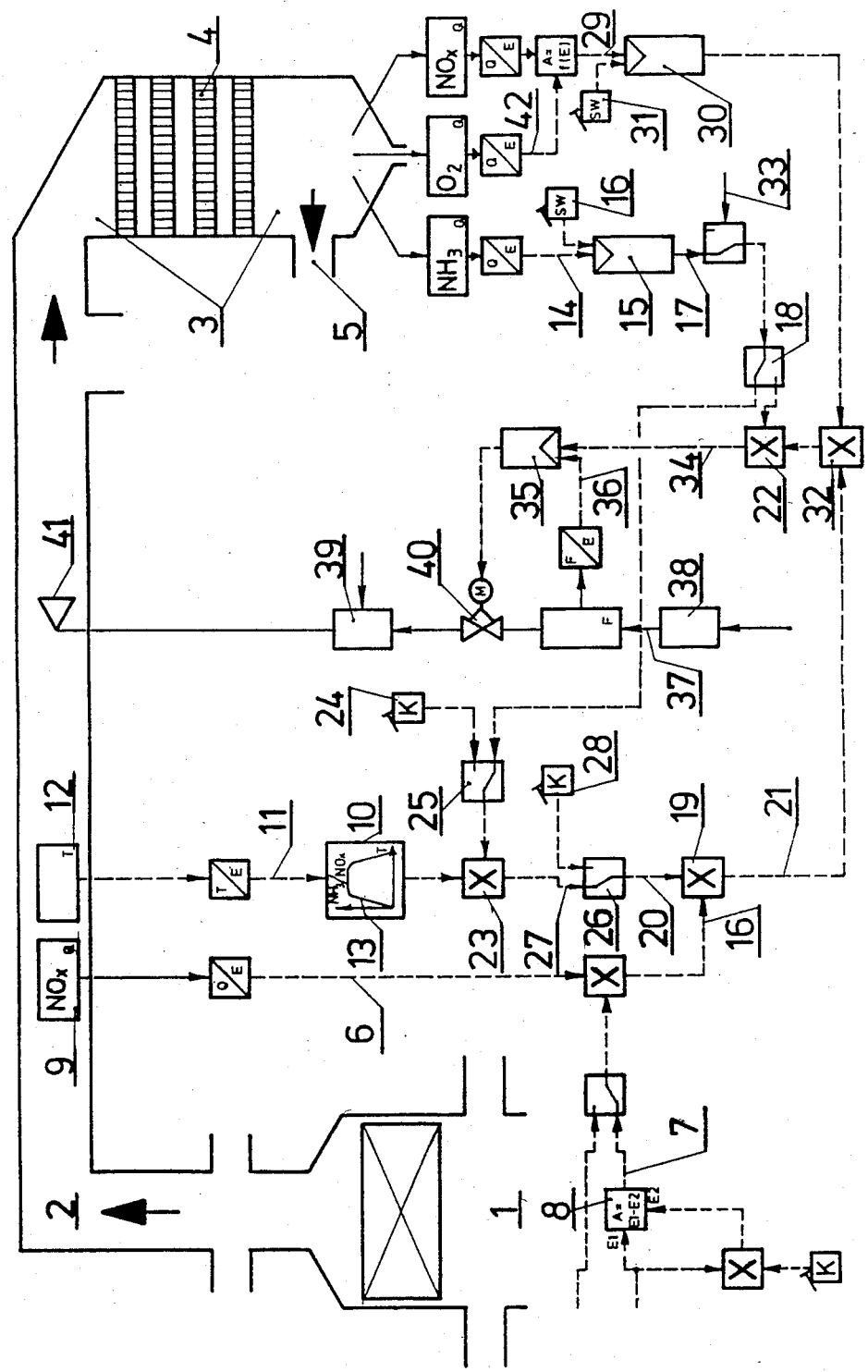

METHOD OF REGULATING THE AMOUNT OF REDUCING AGENT ADDED DURING CATALYTIC REDUCTION OF $NO_x$ CONTAINED IN FLUE GASES

BACKGROUND OF THE INVENTION

1. Field of the Invention

The present invention relates to a method of regulating the amount of reducing agent added, especially $NH_3$ in the case of catalytic reduction of $NO_x$ of flue gases which originate from a combustion installation which is fired with fossil fuels; the adjustment value for the quantity to be added is determined in response to a prescribed reducing agent/$NO_x$ stoichiometry factor from the quantity of combustion air supplied to the combustion installation or from the exiting quantity of flue gas, and from the $NO_x$ concentration downstream ahead of the catalyzer; the method includes a step of influencing the stoichiometry factor.

When fossil fuels are burned, there results in addition to other noxious materials, $NO_x$ which greatly pollutes the environment. In order to reduce the $NO_x$ emissions of combustion installations fired with such fuels, methods are known for effecting a reduction of the $NO_x$ to molecular nitrogen and water vapor using a reducing agent, such as $NH_3$, in the presence of a catalyst such as vanadium compounds on a titanium oxide carrier.

2. Description of the Prior Art

The state of the art is to meter the reducing agent as a function of the flue gas quantity arising from the combustion unit, and of the $NO_x$ concentration downstream ahead of the catalyzer. As an alternative to the flue gas quantity, the quantity of combustion air supplied to the combustion installation is also frequently utilized as the reference value. The adjustment value for the addition of the reducing agent results form a multiplication operation of this input signal with a prescribed reducing agent/$NO_x$ stoichiometry factor. Depending upon the size of the installation and the construction of the reducing unit (effective catalyzer contact surface), the stoichiometry factor is set to a constant value of 0.7 to 1.0. However, this fixing requires that the maximum occurring $NO_x$ concentration is the basis for the reference value for the stoichiometry factor in order to be able to maintain the statutory emission standards.

Not taken into consideration with the heretofore known metering method is that the catalyzer is subjected to a certain amount of aging as a result of contamination due to the $SO_x$ in the flue gas. The dust particles in the flue gas have a similar effect; these particles lead to contamination of the contact surfaces of the catalyzer, and to mechanical wear of the catalyzer material due to the impact of pressure. Taken as a whole, there is therefore a reduction of the activity or displacement of the activity curve of the catalyzer as the duration of operation increases. Due to the fixed, prescribed stoichiometry factor, with the heretofore known regulating process, during the course of the operating time, an excess of the reducing agent is therefore added.

This excess of non-reacted reducing agent initially not only involves an increase of the operating costs, but also involves a series of technical problems. The reducing agent which is not reacted can enter into compounds with the noxious materials contained in the flue gas, with the dew points of these compounds being below the cold gas temperature of the air preheater which is connected after the combustion installation.

Thus, for example from the ammonia added as the reducing agent, and from the $SO_x$ from the flue gas, there is formed ammonium sulfate and ammonium bisulfate, which as a result of the cooling-off of the flue gas in the air preheater below a temperature of about 220° C., are deposited on the surfaces of the heat exchanger. As a result, the heat transfer is reduced, so that the service life of the heat exchanger surfaces of an air preheater are not only limited by corrosion, but also by the excessively added quantity of reducing agent. Not to be underestimated is also the fact that the marketing chances for the end product which is produced during the subsequent desulfurization of the flue gas, for example for a subsequent use as building material, becomes worse to the same extent that the concentration of impurities, i.e. also the reducing agent which has not reacted, increases. Dumping of the reaction products produced during the desulfurization of the flue gas cannot be considered as a possible alternative due to the high cost connected therewith, as well as the possible environmental pollution connected with these materials.

If these drawbacks are relevant to a combustion installation which is operated in a normal operation, these problems are multiplied for generating stations which, in order to adapt to the energy requirement at any given time, are frequently started and stopped, or are operated in low partial-load ranges. The reason for this lies in the temperature-dependent activity curve of the catalyzer. Depending upon the material, the catalyzer develops maximum activity thereof at a flue gas temperature of between 250° to 400° C., with a sharp drop at lower temperatures.

Especially when a combustion installation is started, but also when stopped or operating at extremely low partial load, the flue gases discharged from the installation have a low temperature. When the heretofore known regulation process is used with a fixed, set stoichiometry factor which is designed for normal load, a high excess of reducing agent which does not react is therefore produced after the catalyzer.

An object of the present invention is to further develop a method of the aforementioned general type in such a way that the amount of reducing agent added is optimized for all load situations of a combustion installation, so that an excess of reducing agent downstream after the catalyzer is avoided. At the same time, the reduction of the catalyzer activity as the operating time proceeds should be taken into consideration.

BRIEF DESCRIPTION OF THE DRAWING

These objects, and other objects and advantages of the present invention, will appear more clearly from the following specification in conjunction with the accompanying drawing, which illustrates an exemplary control system for explaining one possible embodiment of the inventive method.

SUMMARY OF THE INVENTION

The method of the present invention is characterized primarily in that the value of the $NO_x$ concentration downstream after the catalyzer is returned to the regulation process as the primary correction value, and the flue gas temperature ahead of the catalyzer is returned to the regulation process as the secondary correction value, with these values influencing the set stoichiometry factor such that while the $NO_x$-emission limit value is maintained as the desired value of the primary correction value, the stoichiometry factor is regulated via the temperature-dependent activity curve of the catalyzer.

An alternative inventive solution is that the reducing agent concentration downstream after the catalyzer serves as the secondary correction value, and that while the $NO_x$-emission limit value is maintained, an excess of not-reacted reducing agent after the catalyzer over a prescribed fixed value in the range of 50 to 3 ppm volume, preferably less than 10 ppm volume, is regulated by an appropriate change of the stoichiometry factor.

A further proposal of the present invention is characterized in that the reducing agent concentration downstream after the catalyzer, and the flue gas temperature ahead of the catalyzer, serve as the secondary correction values, and that the set stoichiometry factor be influenced in such a way that while the emission limit value is maintained as the desired value of the primary correction value, and while a reducing agent concentration downstream after the catalyzer is maintained below a prescribed fixed value in a range of 50 to 3 ppm volume, preferably less than 10 ppm volume, the stoichiometry factor is regulated via the temperature-dependent activity curve of the catalyzer.

The advantages achieved by carrying out the method as taught by the present invention consists in that in all load situations of an installation fired with fossil fuels, the quantity of reducing agent added can be optimally regulated. This not only results in a savings of reducing agent, but at the same time prevents deposits on the heat exchanger surfaces of the air preheater. There is thus no longer the danger of a reduction of the effectiveness of the air preheater as a result of encrustations from the reaction products of non-utilized reducing agent and noxious materials from the flue gas. Furthermore, no impurities in the form of non-utilized reducing agent are found in the end product produced during desulfurization of the flue gas. These advantages are achieved by adapting the stoichiometry factor for the ratio of reducing agent to $NO_x$ while maintaining the statutorially prescribed $NO_x$ emission limit value to the respective load conditions of the combustion installation. The flue gas temperature is measured downstream ahead of the catalyzer, and the stoichiometry factor is corrected via the temperature-dependent activity curve of the catalyzer. Alternatively, the concentration of the not-reacted reducing agent downstream after the catalyzer also can be measured directly in order to be able to carry out an appropriate change of the stoichiometry factor therewith. The aging of the catalyzer material due to contamination from $SO_x$ from the flue gas, as well as mechanical stressing due to dust contained in the flue gas and the thereby accompanying reduction of the catalyzer activity, are inventively countered by returning to the regulation process as secondary correction values not only the reducing agent concentration downstream after the catalyzer, but also the flue gas temperature ahead of the catalyzer. The influencing of the stoichiometry factor is effected in that the reducing agent concentration after the catalyzer does not rise over a prescribed fixed value of, for example, less than 10 ppm volume, and in that the stoichiometry factor is regulated via the temperature-dependent activity curve which is integrated prior to the start of operation.

DESCRIPTION OF PREFERRED EMBODIMENTS

Referring now to the drawing in detail, there is shown combustion chamber of a steam or vapor genera-tor 1, from which the flue gas is fed via a conduit 2 to a reduction reactor 3, which is provided with catalyzers 4; after $NO_x$ reduction is accomplished, the flue gas is subsequently conveyed via a reactor outlet 5 to an air preheater connected downstream therefrom. The determination of the $NO_x$ quantity is effected by multiplication of the $NO_x$ concentration 6 with the flue gas quantity 7, corrected for moisture content. The quantity of air for combustion 8 also can be relied upon. The brass sensor 9 for the $NO_x$ concentration is disposed in the flue gas conduit 2 between the reduction reactor 3 and the generator 1.

The development of the stoichiometry factor is effected via a computer 10 as a function of reactor inlet temperature 11. A temperature sensor 12 also is disposed in the flue gas conduit 2. In order to compensate for the aging of the catalyzer 4, there is taken into account the possibility of shifting of the stoichiometry curve 13 as a function of the $NH_3$ concentration 14, which is measured after the catalyzer 4. The detected $NH_3$ concentration 14 is connected to a correction regulator 15 which compares this concentration with a prescribed theoretical value 16. An output 17 of the correction regulator 15 thus varies the stoichiometry in conformity with the $NH_3$/theoretical value deviation. If desired or if necessary, the $NH_3$ quantity 21, which is conveyed for $NO_x$ reduction by the flue gas quantity 7 or the combustion air quantity 8 after multiplication 19 with the stoichiometry factor 20, also can be corrected directly (22) via the throw-over switch 18. In this case, the output of the stoichiometry computer 10 is not influenced by the $NH_3$ concentration 14, but is determined only by the reactor inlet temperature 11.

The influence of the aging of the catalyzer 4 on the stoichiometry also can be determined, for example, by changing the stoichiometry curve 13 by multiplication 23 of the output of the stoichiometry computer 10 with a fixed, prescribed, manually set factor 24. In this case, the influence of the $NH_3$ correction regulator is changed over via the throw-over switch 25 to the set-value control signal 24.

If desired or if necessary, when the preceding devices are disrupted, or for test purposes, the stoichiometry also can be operated as a set value. For this purpose, the automatically determined stoichiometry factor 27 is switched over via a throw-over switch 26 to a fixed, prescribed, manually adjustable, set-value emitter 28.

With each of the methods of operation which are possible by switching, the $NH_3$ quantity 21 conveyed for $NO_x$ reduction results after the multiplication 19 of the stoichiometry 20 with the flue gas quantity 7 or the combustion air quantity 8.

In order in each case to keep the primary $NO_x$ concentration 29, corrected via the oxygen content 42 which is measured after the catalyzer 4, below the permissible limits, this value is connected to an $NO_x$ correction regulator 30, which after comparing the $NO_x$ actual value 29 with the prescribed theoretical value 31, influences (32) the $NH_3$ quantity 21 in conformity with the deviation at the regulator. The primary $NO_x$ correction regulator 30 has the higher priority versus the $NH_3$ correction regulator 15. This is achieved by having the $NH_3$ correction regulator 15 only be effective as long as the primary $NO_x$ concentration 29 is below limiting value thereof. When a maximum primary $NO_x$ concentration 29 is reached, the influence of the $NH_3$ correction regulator 15 upon the stoichiometry 13, 23 or upon the $NH_3$ quantity 21, 22 is switched off.

The signal 34 for the quantity of reducing agent, which signal was determined by the aforementioned method, is connected to the quantity regulator 35 as the desired value which, after comparison with the actual value 36 of the reducing agent, that is measured in the NH$_3$/vapor line 37 between the NH$_3$ vaporizer 38 and the NH$_3$-vapor/air mixer 39, adjusts the NH$_3$ quantity via the adjustment member 40 in conformity with the deviation from this comparison.

The NH$_3$ quantity determined in this manner is sprayed into the flue gas conduit 2 at 41 between the vapor generator 1 and the reactor 3, and thus, in conjunction with the reactor 3, reduces the actual concentration 6 of the NO$_x$ as determined by the combustion to the prescribed desired concentrations 14, 16 of the NO$_x$.

The constitution of this regulation process thus brings about the required NO$_x$ reduction while making allowance for a method of operation which reduces and conserves reducing agent.

The present invention is, of course, in no way restricted to the specific disclosure of the specification and drawing, but also encompasses any modifications within the scope of the appended claims.

What we claim is:

1. In a process of regulating the amount of reducing agent added during the catalytic reduction of NO$_x$ of flue gases originating from the combustion installation fired with fossil fuels with which an adjustment value to be used for regulation of a quantity of reducing agent to be added is determined selectively, in response to a prescribed reducing agent/NO$_x$ stoichiometry factor, from the quantity of combustion air supplied to the combustion installation, as well as from the quantity of exiting flue gas, plus the NO$_x$ concentration downstream ahead of the catalyzer; the improvement therewith which includes the steps of:

returning to the regulation process, as a primary correction value, the value of the NO$_x$ concentration downstream after said catalyzer;

returning to the regulation process, as a secondary correction value, the reducing agent concentration downstream after said catalyzer; and while maintaining the NO$_x$ emission limit value, appropriately changing said stoichiometry factor in such a way as to regulate an excess of not-reacted reducing agent after said catalyzer over a prescribed fixed value of from 50 to 3 ppm volume.

2. A process according to claim 1, which includes the step of changing said stoichiometry factor in such a way as to regulate an excess of not-reacted reducing agent after said catalyzer to less than 10 ppm volume.

3. In a process of regulating the amount of reducing agent added during the catalytic reduction of NO$_x$ of flue gases originating from a combustion installation fired with fossil fuels with which an adjustment value to be used for regulation of a quantity of reducing agent to be added is determined selectively, in response to a prescribed reducing agent/NO$_x$ stoichiometry factor, from the quantity of combustion air supplied to the combustion installation, as well as from the quantity of exiting flue gas, plus the NO$_x$ concentration downstream ahead of the catalyzer; the improvement therewith which includes the steps of:

returning to the regulation process, as a primary correction value, the value of the NO$_x$ concentration downstream after said catalyzer;

returning to the regulation process, as secondary correction values, the reducing agent concentration downstream after said catalyzer, and the flue gas temperature ahead of said catalyzer; and influencing the set stoichiometry factor in such a way that, while maintaining the NO$_x$ emission limit value as the desired value of the primary correction value, and while maintaining a reducing agent concentration downstream after said catalyzer below a prescribed fixed value ranging from 50 to 3 ppm volume, said factor is regulated via the temperature-dependent activity curve of said catalyzer.

4. A process according to claim 3, in which said influencing step includes maintaining said reducing agent concentration after said catalyzer below less than 10 ppm volume.

* * * * *